No. 773,058. PATENTED OCT. 25, 1904.
J. P. CLEAL.
CASH REGISTER.
APPLICATION FILED OCT. 7, 1899.
NO MODEL. 7 SHEETS—SHEET 1.
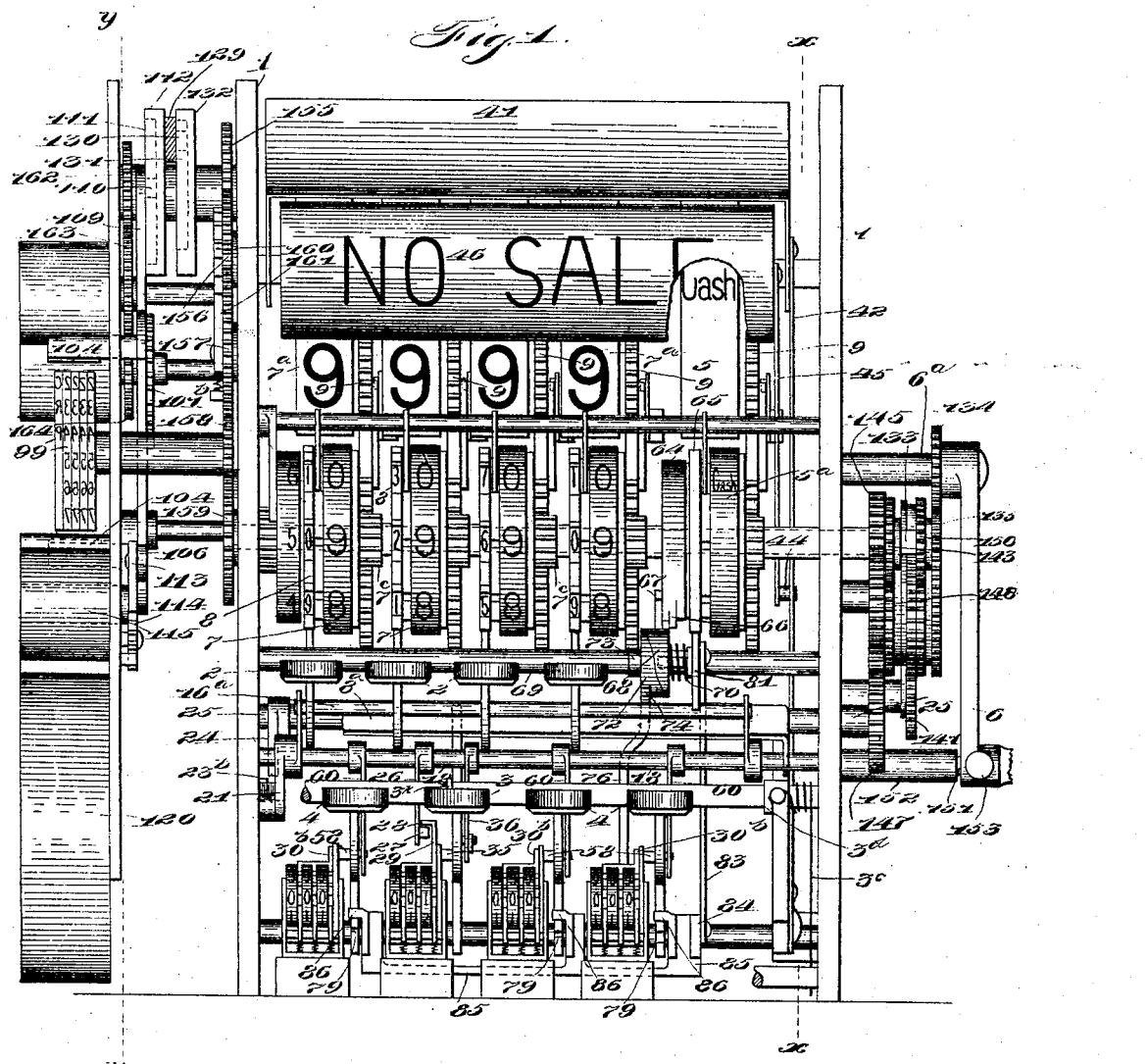
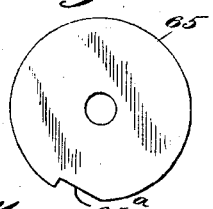
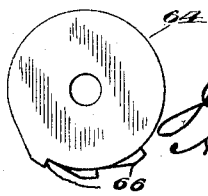
Witnesses
Inventor
Joseph P Cleal
by Alvan Macauley
Attorney No. 773,058. PATENTED OCT. 25, 1904.
J. P. CLEAL.
CASH REGISTER.
APPLICATION FILED OCT. 7, 1899.
NO MODEL. 7 SHEETS—SHEET 2.
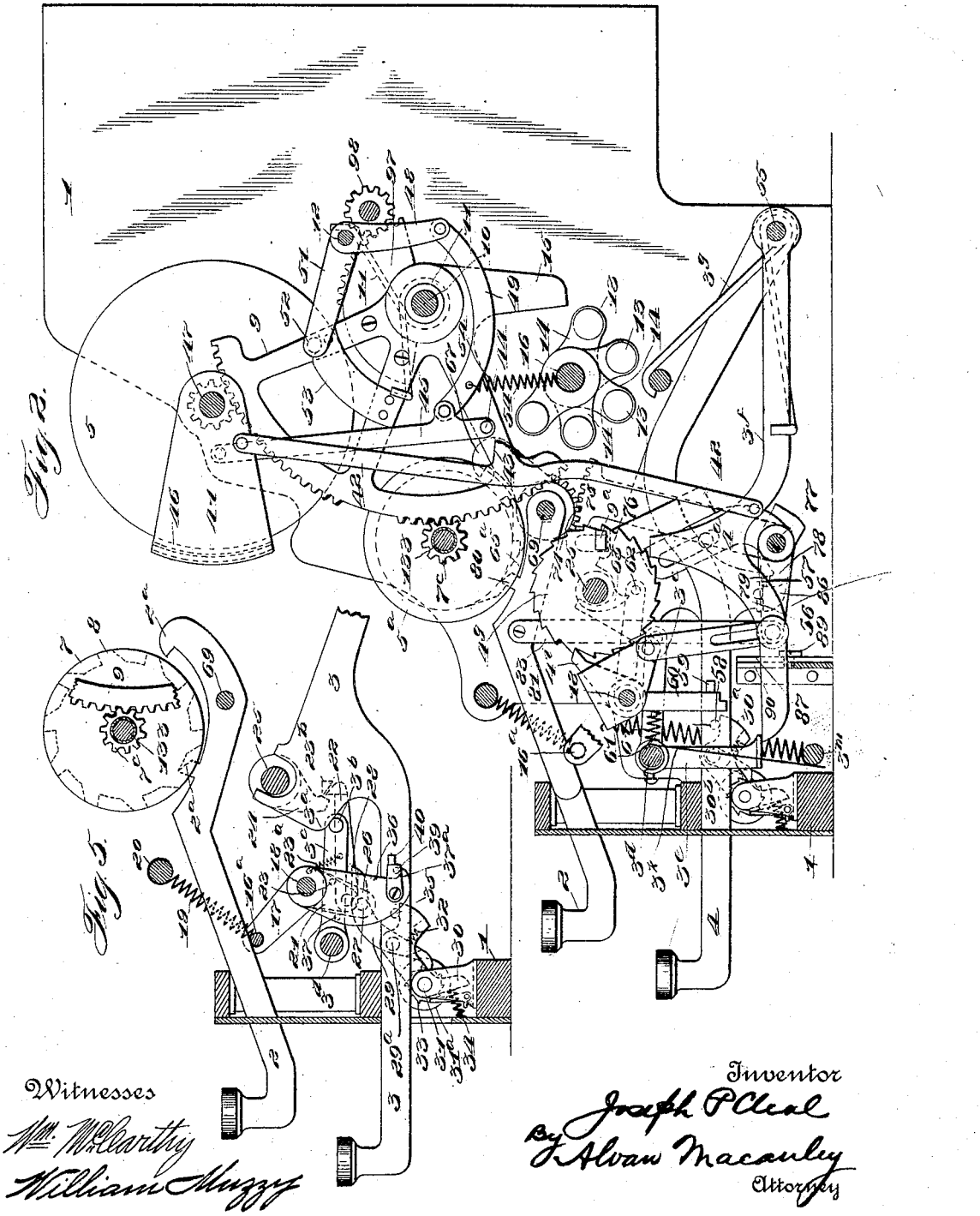
Witnesses
Wm. McCarthy
William Muzzy
Inventor
Joseph P Cleal
By T. Alvan Macauley
Attorney No. 773,058. PATENTED OCT. 25, 1904.
J. P. CLEAL.
CASH REGISTER.
APPLICATION FILED OCT. 7, 1899.
NO MODEL. 7 SHEETS—SHEET 3.
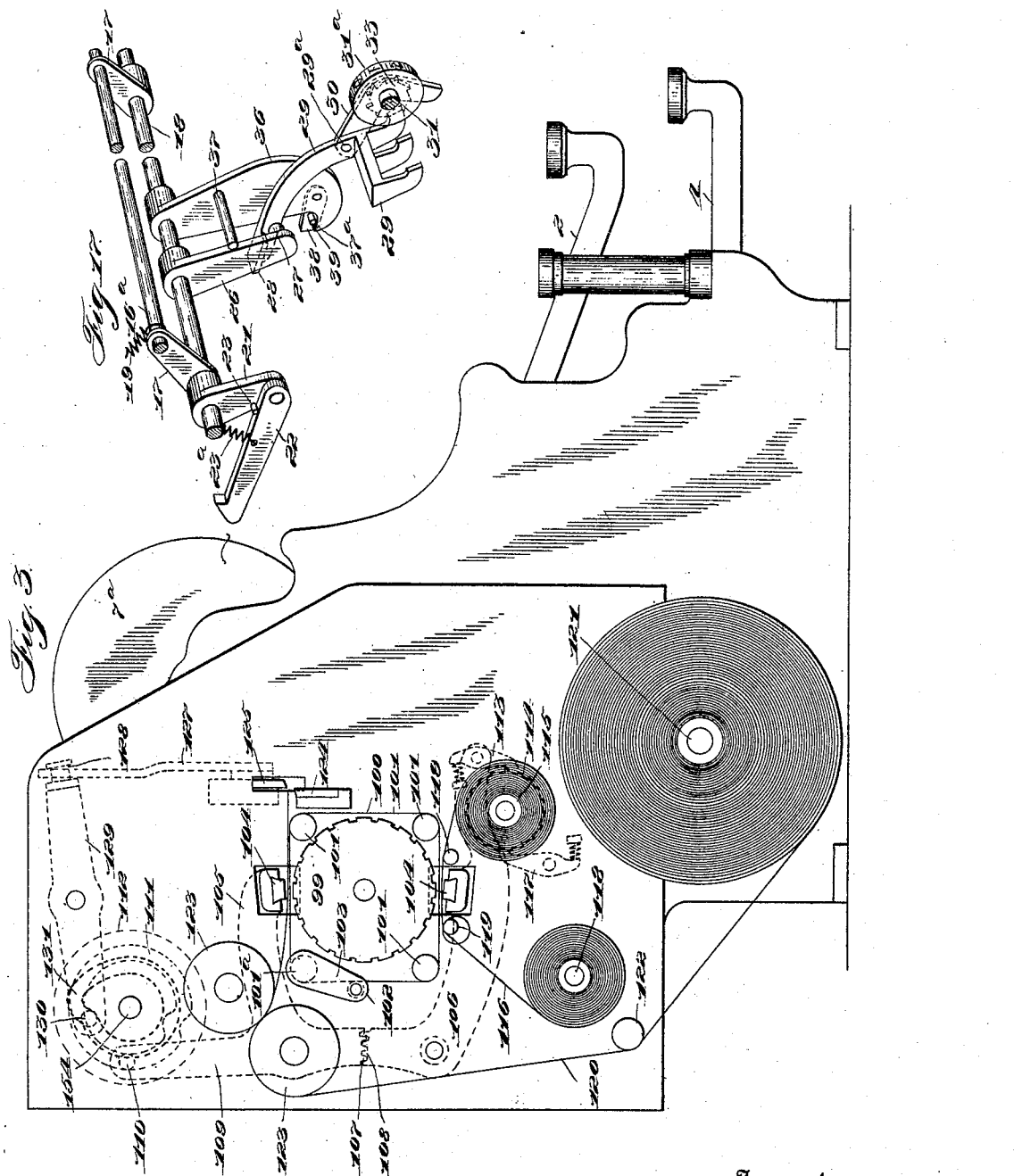
Witnesses
WM. McCarthy
William Muzzy
Inventor
Joseph P. Cleal.
By Alvan Macauley
Attorney No. 773,058. PATENTED OCT. 25, 1904.
J. P. CLEAL.
CASH REGISTER.
APPLICATION FILED OCT. 7, 1899.
NO MODEL. 7 SHEETS—SHEET 4.
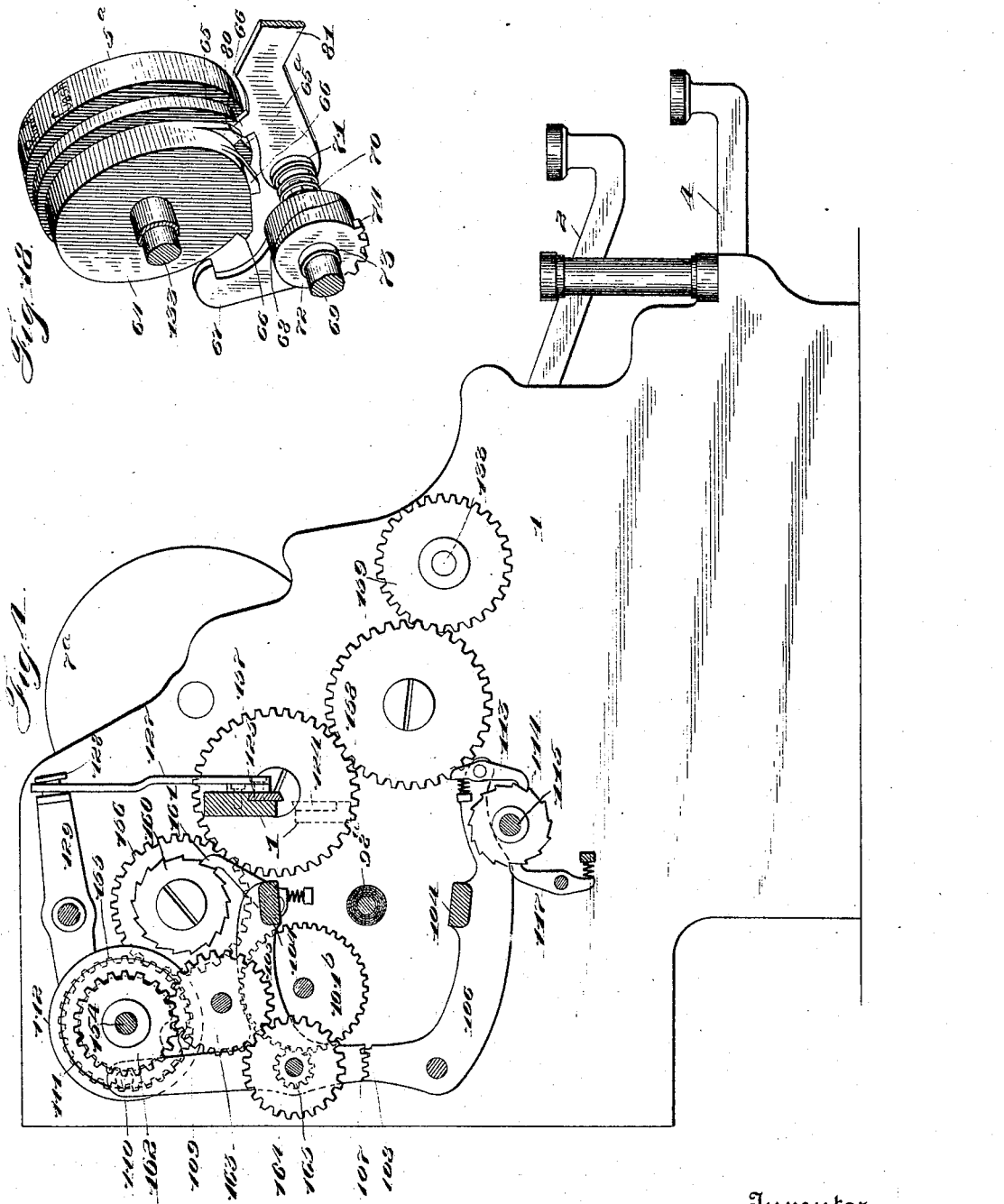
Witnesses
Inventor
Joseph P. Cleal
By Alvan Macauley
Attorney No. 773,058. PATENTED OCT. 25, 1904.
J. P. CLEAL.
CASH REGISTER.
APPLICATION FILED OCT. 7, 1899.
NO MODEL. 7 SHEETS—SHEET 5.
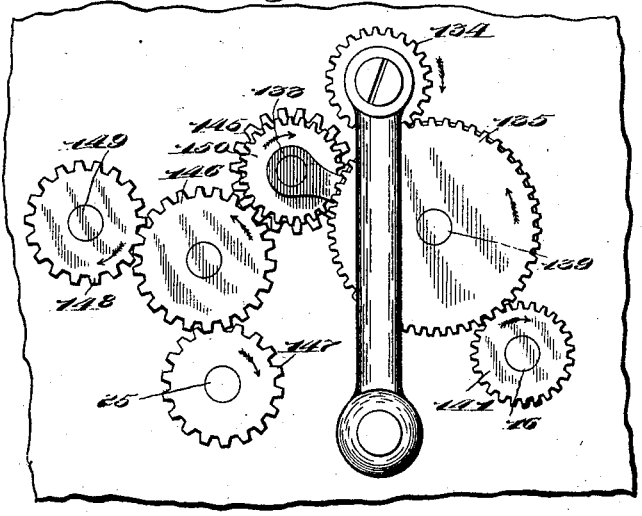
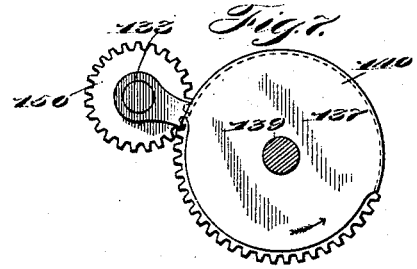
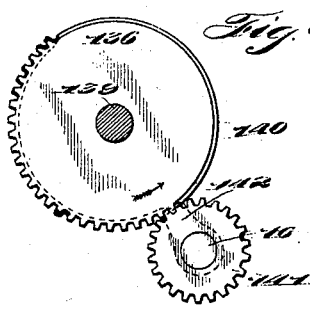
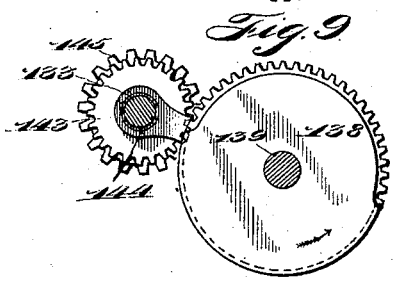
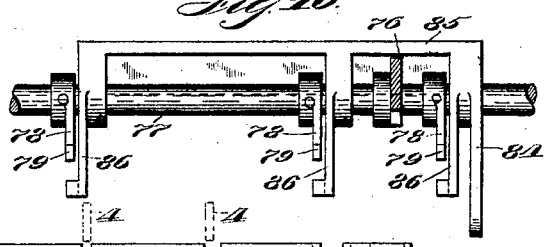
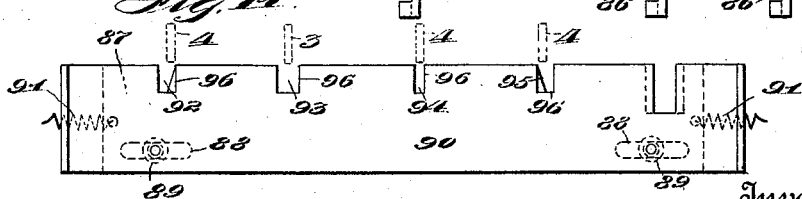
Witnesses
Wm. McCarthy
William Huzzy
Inventor
Joseph P. Cleal
By Alban Macauley
Attorney No. 773,058. PATENTED OCT. 25, 1904.
J. P. CLEAL.
CASH REGISTER.
APPLICATION FILED OCT. 7, 1899.
NO MODEL. 7 SHEETS—SHEET 6.
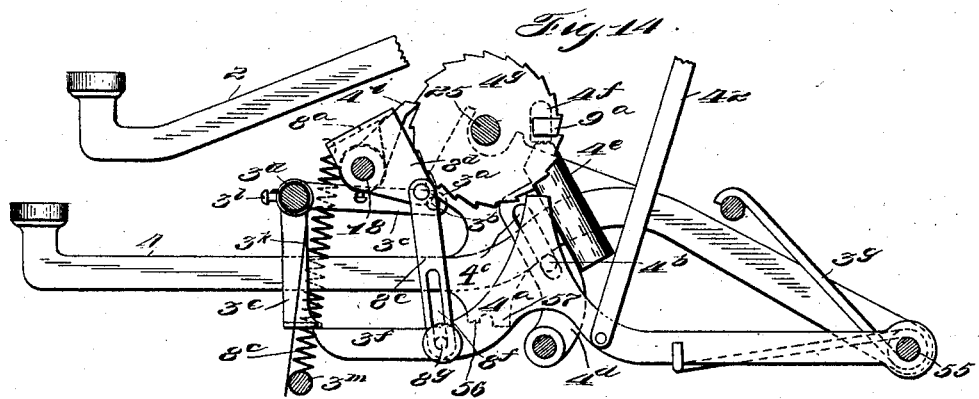
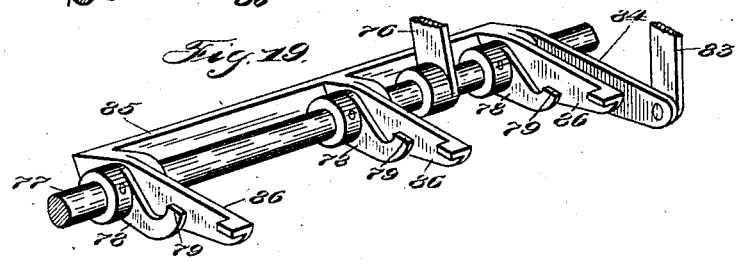
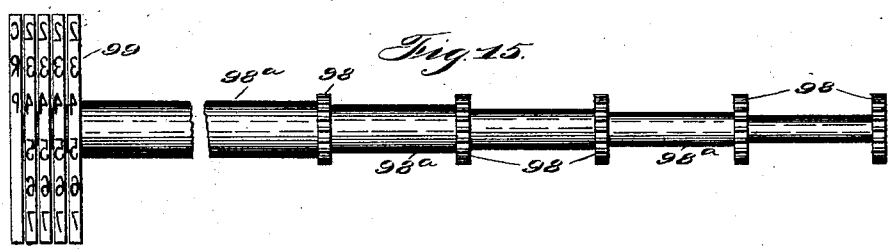
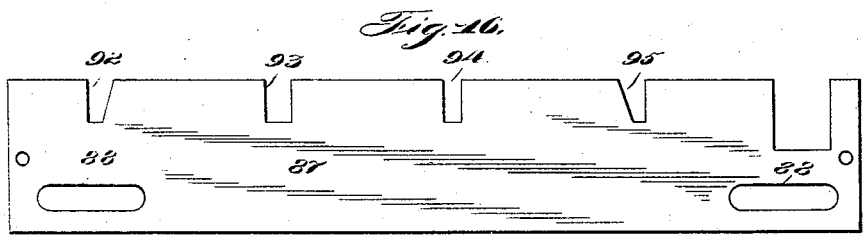
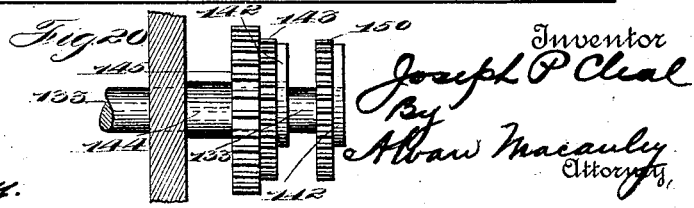

No. 773,058. PATENTED OCT. 25, 1904.
J. P. CLEAL.
CASH REGISTER.
APPLICATION FILED OCT. 7, 1899.
NO MODEL. 7 SHEETS—SHEET 7.
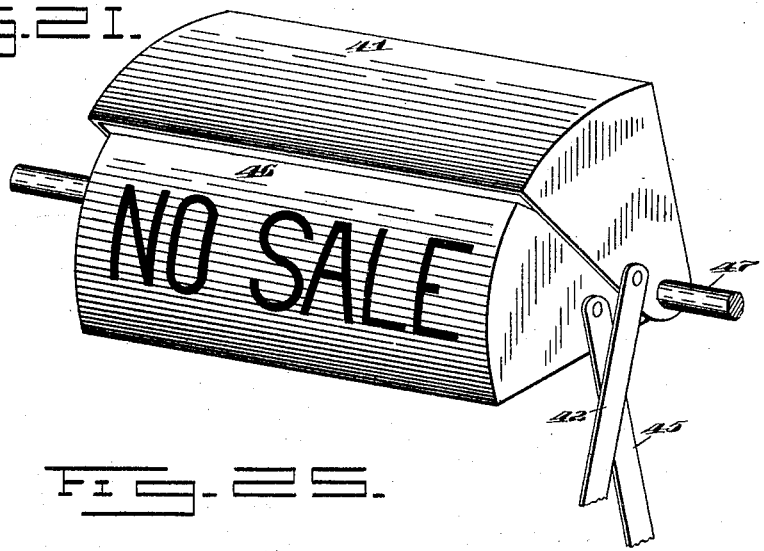
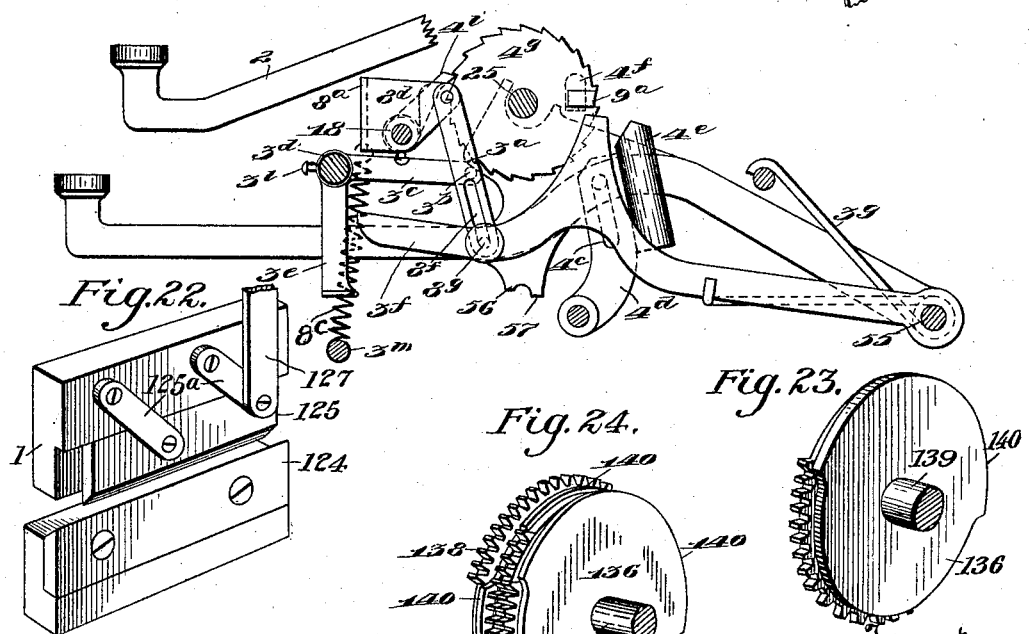

No. 773,058.

Patented October 25, 1904.

UNITED STATES PATENT OFFICE.

JOSEPH P. CLEAL, OF DAYTON, OHIO, ASSIGNOR TO THE NATIONAL CASH REGISTER COMPANY, OF JERSEY CITY, NEW JERSEY, A CORPORATION OF NEW JERSEY.

CASH-REGISTER.

SPECIFICATION forming part of Letters Patent No. 773,058, dated October 25, 1904.

Application filed October 7, 1899. Serial No. 732,876. (No model.)

*To all whom it may concern:*

Be it known that I, JOSEPH P. CLEAL, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash-registers, and has more particular relation to improvements in registers of the class patented to Hess and Stoughton, No. 597,676, dated January 18, 1898.

In the cash-register art as it stands at present no provision has been made in machines of the type above mentioned for keeping a record of the special transactions, such as "charge," "paid out," "received on account," &c.; and one of the several objects of the present invention is the application to such machines of recording and indicating devices for such special transactions.

A further object is to provide this particular type of machine with an improved printing mechanism for keeping a printed record in detail of all transactions.

In the accompanying drawings, forming part of this specification, Figure 1 represents a front elevation of a machine of the class mentioned with my improvements applied thereto, the cabinet being removed and part of the special indicator broken away and the cash-drawer omitted. Fig. 2 represents a vertical transverse section through the same on the line *x x* of Fig. 1. Fig. 3 represents an end elevation of said machine, showing the printing attachment. Fig. 4 represents a vertical transverse section through the machine on the line *y y* of Fig. 1. Fig. 5 represents a detail vertical section through the lower portion of the machine, taken on the line of the release-key. Fig. 6 represents an enlarged detail side elevation of the driving-gearing and operating-handle. Figs. 7, 8, and 9 represent, respectively, detail side elevations of the mutilated gears and their connections with the several independent operating-gears. Fig. 10 represents a detail top plan view of the universal rock-frame which is arranged to be actuated by the special keys. Fig. 11 represents a detail front elevation of the guide-plate and the locking-plate for the special keys. Fig. 12 represents a detail side elevation of the locking-disk for the special escapement-wheel. Fig. 13 represents a detail side elevation of said special escapement-wheel. Fig. 14 represents an enlarged detail side elevation of the locking devices for the amount-keys and the operating-handle. Fig. 15 represents a detail side elevation of the nested sleeves, pinions, and printer-wheels. Fig. 16 represents a detail side elevation of the locking-plate for the special keys. Fig. 17 represents a detail perspective view of the shifting devices for the special "no sale" and "release" key. Fig. 18 represents a detail perspective view of the special escapement-wheel, its latching-disk, the special indicator, and coöperating parts. Fig. 19 represents a detail perspective view of the shaft carrying the operating-arms having noses of graduated heights and the universal rock-frame. Fig. 20 represents a detail top plan view of the printer-shaft and its operating-gear and the sleeve and its gears mounted on the same. Fig. 21 represents a detail perspective view of the special indicator and the flash or shutter. Fig. 22 represents a perspective view of the knives for severing the check-strip. Fig. 23 represents a detail perspective view of one of the mutilated gear-wheels. Fig. 24 represents a detail perspective view of the mutilated gears shown in Figs. 7, 8, and 9 assembled; and Fig. 25 represents a view similar to Fig. 14 with the parts in the positions they assume when the release-key is operated.

In the said drawings, 1 represents the frame of the machine; 2, the regular amount-keys; 3, the special release-key; 4, the special-transaction keys; 5 and 5ª, the special indicators, and 6 the operating-handle.

The construction and operation of the regular amount-keys, indicator-wheels, and counter-wheels are substantially the same as described in the said patent, with the exception of a few minor constructions hereinafter set forth.

In general terms, the machine to which my improvements are applicable comprises two series of corresponding indicators 7 and $7^a$, Fig. 1, geared together, so as to be moved conjointly by pivoted segmental rack or registering frames 9, similar to that shown in Fig. 2 in connection with the special indicators 5 and $5^a$.

The amount-keys 2 are pivoted near their rear ends upon a transverse shaft 69 and are provided, as better shown in Figs. 1 and 5, with escapement-lugs $2^a$, which act in conjunction with toothed escapement counter-wheels 8 to permit the latter to move one tooth upon each depression of their respective keys. These wheels are connected to their respective indicators 7, so as to receive motion therefrom by any suitable ratchet-and-pawl mechanism. (Not here shown, but shown and described in the aforesaid patent.) Each indicator 7 is provided with a pinion $7^c$, with which its respective rack 9 meshes. The said indicator-wheels 7 and $7^a$ are geared together, as before stated, by the segmental rack-frames 9, which are journaled upon a transverse shaft 10 and are normally held under spring tension, so as to rise to elevated positions when released by spiral springs 11, mounted on said shaft 10. (Shown in broken lines, Fig. 2.) There is one spiral spring 11 for each of four segment-racks 9, and each spring bears at its rear end against the fixed shaft 12, and its other end bears under and against its segment-rack 9, so that the latter constantly tends to swing upward, but is normally restrained in so doing, as will be presently described.

The above-described construction, except the particular style of springs employed, is fully described in the aforesaid patent.

The frames 9 are depressed to put the springs 11 under tension by a series of antifriction-rollers 13, mounted on arms 14 (see Fig. 2) and adapted to engage pendent projections or arms 15, formed on the respective frames. The arms 14 are mounted in different positions upon a rotation-shaft 16, so that upon the movement of said shaft they will successively engage their respective arms 15 and restore them to normal position, in which were the shutters 41 and 46 raised the indicator would show "0."

In operating my improved cash-register the handle is first actuated to draw the main flash or shutter 41 down over the indicators, turn the indicators to zero, and unlock the amount-keys. The latter are then operated to set the indicators and register the amount, and a release-key is finally depressed to allow the indicator-flash to rise, unlock the operating-handle, and lock the amount-keys. As above explained, the amount-keys operate in connection with the registering and indicating devices substantially as shown and described in the patent referred to.

The combined release and no-sale key 3, which is pivoted on a shaft 55, operates as a release-key in the following manner: It is formed with an operating-nose $3^a$, which is so arranged that when said key is operated it will engage and depress a pin $3^b$, mounted on an arm $3^c$, which arm is fast to a rock-shaft $3^d$. (See Figs. 5 and 14.) The arm $3^c$ is normally held elevated by a coil-spring $3^k$, which surrounds the shaft $3^d$, so that its ends respectively bear against a pin $3^l$ on said shaft and a transverse shaft $3^m$. The shaft $3^d$ also carries a pendent arm $3^e$, which arm acts as a latch for a pivoted lever $3^f$ to hold the same in its depressed position against the tension of a spring $3^g$, which normally tends to throw it upward. This lever is provided with a vertical extension $4^a$, carrying a pin $4^b$, which latter operates in an elongated slot $4^c$, formed in a pivoted arm $4^d$. This arm carries a stop $4^e$, which coöperates with a projection $4^f$, mounted on a ratchet-wheel $4^g$, to arrest the movement of the latter, and thus lock the operating-handle 6, which is geared to the shaft 25, upon which said ratchet-wheel is mounted, as hereinafter described. When the pin $4^b$ moves up in the slot $4^c$ upon the lever $3^f$ being released, it throws the arm $4^d$ back, so that the stop $4^e$ is moved out of the path of the projection $4^f$, and thus leaves the wheel $4^g$ free to be turned. Any backward movement of the operating-handle is prevented by a spring-pressed pawl $4^i$, suitably mounted on a shaft 18, so as to engage said ratchet-wheel $4^g$.

It will be seen from the above description that the special release-key must be operated before the crank-handle can be turned.

The amount-keys 2 are locked in position until after the crank-handle has been operated by a locking plate or yoke $8^a$, (see Figs. 1 and 14,) which is pivotally mounted upon the transverse shaft 18 so as to extend under all of the keys 2 and is normally drawn into locking position beneath said keys by a coil-spring $8^c$, which connects it with the shaft $3^m$. In Fig. 14 the plate $8^a$ is shown in unlocking position. This plate $8^a$ is provided with an arm $8^d$, to which is pivotally connected a link-bar $8^e$, having an elongated slot $8^f$ at its lower end. This link-bar is connected to the lever $3^f$ by a headed pin $8^g$, mounted on said lever and projecting through the slot $8^f$. After the release-key has been operated and the lever $3^f$ thereby allowed to ascend under impulse of the spring $3^g$ then the plate $8^a$ will be turned to normal position, its upper edge lying closely under the lower edges of the amount-keys and preventing the latter from being moved. (See Fig. 25.) When the lever $3^f$ is reset under the arm $3^e$, as hereinafter described, the link $8^e$ is drawn down, and thus rocks the plate $8^a$ out of the path of the amount-keys into the position shown in Fig. 14. This depression of the lever $3^f$ is effected by a lug $9^a$, mounted on the wheel $4^g$ and arranged to strike the top of the extension $4^a$ when said wheel is rotated by the crank-handle, and thus force said extension and lever down.

Passing now to my improvements as applied to a machine of the class above mentioned, I will first describe the construction and operation of the special no-sale and release key 3. As previously described, the regular operation of the machine is, first, turn the crank 6, then press the amount-keys, and finally operate the release-key. If it is desired simply to open the cash-drawer to make change—that is, to record a no-sale transaction without registering anything—the operation is to first turn the crank and then press the release-key. The devices for securing this double function of the release-key are better illustrated in Figs. 5 and 17 and comprise a swinging cross-bar 16ª, extending under all the amount-keys and supported in position by two arms 17, which are fast to the transverse rock-shaft 18. The bar 16ª is held normally up in contact with the amount-keys by a coil-spring 19, which connects it with a rigid bar 20, mounted in the main frame.

It will be observed from the above that whenever an amount-key is operated the shaft 18 is rocked, and thus operates a short arm 21, fast to the same near one end, as shown in Figs. 1 and 17. This arm 21 carries a rearwardly-extending pivoted hook-pawl 22, which is normally held in an approximately horizontal position against a pin 23 on said arm by a coil-spring 23ª, which connects it with the collar carrying said arm 21. When the shaft 18 is rocked, the pawl is thrust rearward so that its hook end catches under a stud 23ᵇ, mounted on the main frame to hold said shaft in the position to which it has been moved. (See Figs. 1 and 5.) The hook end of said pawl is of a width greater than the length of the stud 23ᵇ, so as to leave a free unobstructed surface on said pawl for the contact of a cam 24, which is mounted upon the rotation-shaft 25 in such manner as to engage and force the pawl downward, and thus disengage it from the stud 23ᵇ near the end of the rotation of said shaft. By the above means when the shaft 18 is rocked forward by the operation of an amount-key it is caught and so held until the machine is operated by the crank-handle 6. The shaft 18 further carries an arm 26, fast thereon and provided with a laterally-projecting pin 27, which latter is adapted when the arm is rocked rearwardly to pass under a horizontal flange 28, formed on an operating-pawl 29, whereby said pawl is rocked out of operative position when it is depressed, as hereinafter described. Said pawl 29 is pivotally mounted, as at 29ª, upon a lever 30, (see Fig. 17,) which in turn is pivoted upon a counter-shaft 31 and is provided with a coil-spring 32 for normally forcing the pawl forward into engagement with a counter-operating ratchet 33. The lever 30 is normally held with its rear end elevated by a coil compression-spring 34, interposed between it and a portion of the main frame. When the release or no-sale key 3 is operated, a pin 35, mounted thereon, contacts with the rear end of lever 30 and depresses the same, thereby causing the pawl 29, carried by said lever, to be operated. If one of the amount-keys is operated before the operation of said release-key, the arm 26 is swung forward, as before described, so as to bring the pin 27 under the flange 28 of the pawl 29. Now when said key 3 is depressed and the pawl 29 thereby moved downward, as above described, the flange 28 of said pawl will engage said pin 27, mounted on the arm 26, with the result that the pawl will be rocked against the tension of the spring 32, so as to disengage its lower end from the teeth of the ratchet-wheel 33. When the machine is operated as above, the key 3 simply acts in its usual capacity of a release-key and no addition is made upon the no-sale counter 31ª, which is normally operated by the pawl 29. When the key 3 is used in this normal capacity of release-key, it is desirable in order to prevent any fraudulent manipulation that said key be locked after such operation, so that it can be again actuated only after the handle has been operated. To accomplish this result, I mount a swinging plate 36 loosely upon the shaft 18 and provide the same with a laterally-projecting pin 37, which rests against the edge of the arm 26, and thus normally holds said plate out of operative position. The lower end of the plate 36 is formed with a shoulder 37ª and is provided with a pivoted stop 38, having a pin 39, which rests on said shoulder. This pivoted stop coöperates with a lug 40, mounted on the key 3, as shown in Fig. 5. When an amount-key is operated before the special key, the plate 36 is left free to swing forward by the forward movement of the arm 26 out of the path of the pin 37. When the key 3 is subsequently depressed, the lug 40 is moved downward out of the path of the stop 38, and the latter will then pass over the top of the lug 40 until the lower end of the lever 36 strikes said lug. As the key now moves up the lug raises the stop and as it clears the lower end of the plate 36 permits the latter to swing farther forward, so that the shoulder 37ª of said plate will pass under the lug, and thus prevent another depression of said key until the handle 6 has been operated to return the plate 36 to its first position. This operation takes place near the end of the movement of the operating-handle by the rocking of the shaft 18 and movement of the arm 26, as above described in connection with the release of the hook 22. If the release-key were arranged so that it could be successively operated, the operator might simply depress the same and open the cash-drawer without registering if he had two successive sales of the same amount.

The above relates to the action of the locking-plate 36 when the amount-keys are first operated; but when these keys are not operated and the special key is simply to be used as a no-sale key to open the drawer the plate is held so far back by the arm 26 that the pawl 38 will not operate to lock the key.

The independent counter employed in connection with the operating-pawl 29 may be of any suitable construction in which one unit is added upon each operation of the actuating-pawl, many such structures being known to the art and needing no further explanation here.

It will be seen from the above that each time the key 3 is operated for a no-sale transaction it acts to release the operating-handle, flash, &c., by depressing the pin 3ᵇ, and thus operating the connected parts in the same manner as above described and also registers a unit upon the no-sale counter, so that the exact number of times the machine has been operated for no-sale transactions may be ascertained at a glance.

In addition to registering each no-sale transaction I also provide means for indicating such transactions. The regular guard or flash 41 for the indicators 5 and 7ᵃ is operated by the levers 3ᶠ through the medium of a link 42, which connects said flash and lever in substantially the same manner described in said patent. The link 42 is formed with a shoulder 43, which is adapted to coact with and lift a pin 44, mounted on a link-rod 45. The upper end of this rod 45 is pivoted to the special no-sale indicator or flash 46, which is of a yoke formation and is journaled on indicator-shaft 47, so as to operate in practically the same manner as the regular flash, but within the same. Suitable words indicating that no sale has been made are formed on the front of said special indicator 46. The rod 45 is pivotally connected to an operating-arm 48 by a link 49, and said arm is mounted fast upon the rock-shaft 12. This shaft is provided with a series of arms 51, similar to that shown in Fig. 2, one for each frame 9, and each of said arms is in turn provided at its forward end with a pin 52, which coöperates with a notched segment 53 on its respective frame 9. When the frames are in normal position, as shown in Fig. 2, the pins 52 lie in the notches of the segments 53 with the pin 44 out of the path of the shoulder 43; but when one of the amount-keys or one of the special keys hereinafter described is operated and its frame 9 thereby allowed to escape upward the segment 53 of said frame forces the pin 52 of its respective arm 51 upward, and thereby rocks the shaft 12. This movement of the shaft operates arm 48 and link 49 and swings the rod 45 forward, so that the pin 44 projects into the path of the shoulder 43. When the bar 42 is now raised, the rod 45 is also raised, and both of the flashes are elevated to expose the indicators 5 and 7ᵃ. If none of the amount-keys are operated—as, for instance, when a no-sale transaction is made—the bar 42 is raised alone, as the pin 44 is not then in the path of the shoulder 43, and the no-sale indicator is thus left exposed, but still covers the indicators 5 and 7ᵃ. The link 49 is connected to a coil-spring 54, which normally draws said link down to hold the no-sale indicator in exposed position.

The above description relates to the special no-sale and release key and the amount keys, and I will now pass on to a description of the three remaining special keys 4 for the special transactions. As these keys are all similar in construction and operation, a description of one will suffice for all. Each of said keys comprises a key-lever pivoted at its rear end upon a shaft 55 at the rear of the machine and provided with two spaced pendent lugs 56 and 57. (See Figs. 2 and 14.) Each key-lever carries a pin 58, which coöperates with a lever 30ᵃ, carrying a pawl 30ᵇ for operating a special counter in a similar manner to the devices operated in connection with the special key 3, except that the pawl engages its ratchet-wheel at all times. Further, each key-lever carries a lug 59, which is adapted to become latched in its lowermost position when the key is depressed by one of a series of latching bell-crank arms 60, pivoted on shaft 18 and each normally forced against said lug by a coil-spring 61. One end of each of said levers 60 is provided with a pin 62, which is so located as to be struck and depressed by one of a series of cams 63, mounted on the rotation-shaft 25. It will be seen from the above that when a key 4 is depressed it is caught and held in this depressed position by its respective latching-arm and is not released again until the operating-handle has been turned to cause the cam 63 to trip said latch.

The construction thus far described provides for registering the number of times each special key 4 is operated; but in addition I also desire to indicate the character of each special transaction, whether it be "charge," "paid out," "received on account," or the regular transactions of cash. For this purpose I provide the special indicators 5 and 5ᵃ, which have suitable indicating characters or words and are similar to the regular indicators and are geared together in the same manner. One exception to the above statement is that the smaller or operator's indicator 5ᵃ is not formed with an escapement ratchet-wheel, but in lieu of the same is provided with an escapement-wheel 64 and a latching-disk 65. (See Figs. 1 and 18.) The wheel 64 is formed with a series of stop projections 66, arranged at different points thereon and in different vertical planes, as shown in Figs. 13 and 18. The locations of the several projections 66 are such as to stop the indicators 5ª and 5 in the correct positions for exposing the proper indications. The stops are arrested by contact with a hook-pawl 67, which is movable laterally so as to be brought into the path of any one of said projections, and thus stop the indicator at different points, according to the projection with which it is coöperating. This lateral movement of said pawl is effected by a cam-faced sleeve 68, upon which said pawl is mounted and which is in turn mounted loosely upon a transverse rigid shaft 69, but is keyed thereto so as to be incapable of rotation, but free to move longitudinally thereon. The said sleeve is normally held in its extreme left-hand position, as shown in Fig. 18, with the pawl 67 out of the paths of all of the projections 66 by a coil-spring 70, which surrounds the shaft 69 and bears with its opposite ends against said sleeve 68, and a disk 71, fast to the shaft. The sleeve 68 is moved laterally to bring the pawl 67 into the desired position to intercept one of the projections 66 by a coöperating cam-faced sleeve 72, mounted to rotate on the shaft 69, but prevented from moving longitudinally thereon by a collar 73, fast to the shaft. The cam-faces of the sleeves 68 and 72 fit snugly together, as shown in Fig. 18, when the sleeves are in their normal positions. The sleeve 72 is rocked to move its companion sleeve longitudinally by a gear-segment 74, formed thereon and meshing with a segmental gear 75, formed on the end of a pivoted lever 76. (See Fig. 2.) This lever is fast to a rock-shaft 77, mounted in the main frame. (See Figs. 2 and 10.) Said shaft 77 is provided with three arms 78, having noses 79 of different heights, as shown in Fig. 19. These noses are so arranged as to be struck and depressed by the pendent lugs 57 of the respective special keys 4. It will be observed that as the noses are of different elevations the movements of the arms on which said noses are formed will vary according to the key operated, and thus impart different movements to the rock-shaft 77 and to the lever 76, carried thereby. By this means the desired movement of the cams 68 and 72 is secured and the special indicators stopped to expose indications corresponding to the special key operated. In order to hold the escapement-wheel in normal position until the pawl 67 has been set to properly arrest the same, or when none of the special keys 4 are operated, the disk 65 is formed with a stop-notch 65ª, into which a stop-lug 80 normally projects to lock said disk against movement. This lug is mounted upon a lever 81, which is journaled upon the shaft 69 and projects forward over the bar 16ª. This lever is connected by a pivoted link 83 to an arm 84, (see Fig. 10,) formed on a rock-frame 85, which is journaled on the shaft 77. This frame is formed with three operating-arms 86, which are adapted to be struck and depressed by the lugs 56. It will be seen that the lugs 56 are shorter than the lugs 57, so that the latter will operate to set the stop-pawl 67, as before described, before the former actuate the release-lever 81 to permit the escapement-wheel to move under the impulse of its spring-pressed segment 9. After the pawl 67 is set it holds the indicators in position until the next operation of the machine, when the latch 60, which has held the depressed special key in its lowermost position, is tripped, as before described. It will also be observed that as the lever 81 projects forward over the bar 16ª said lever when operated by any one of the special keys, as above described, will depress said bar, and thus convert the key 3 into a release-key in the manner before described, so that when it is operated it will not register upon the no-sale counter. The lever 81 is also held depressed until the succeeding operation of the machine by the special key that has been operated and which is held in its lower position, as above described.

The above construction for converting the no-sale key into a release-key is necessary, as when the special keys are operated none of the amount-keys are used, and the bar 16ª would not therefore be otherwise depressed. When none of the special keys 4 are operated, the indicator 5ª remains latched, with the cash indication in exposed position. When one of said special keys is operated and its rack-frame 9 thereby allowed to ascend, the bar 45 is permitted to pass forward, so as to be operated to raise the no-sale indicator in the same manner as described in connection with the frames of the amount-keys.

As it is necessary to prevent the operation of more than one of the special keys 4 during one operation of the machine in order to avoid fraudulent manipulation, I provide a slidable locking-plate 87, which extends laterally below the lower bank of keys. (See Figs. 2, 11, and 16.) This plate is formed with elongated guiding-slots 88, through which pass supporting-pins 89, the latter being mounted in a guide-plate 90, fast to the main frame. The said plate 87 is held in its normal balanced position by coil-springs 91 and is provided in its upper edge with notches or slots 92, 93, 94, and 95, into which the respective special keys 3 and 4 are adapted to pass when operated. It will be seen by reference to Fig. 16 of the drawings that the slot 93 for the no-sale key is of such width that said key may be operated no matter what the position of the plate 87. The slot 94 is of such width as to prevent any longitudinal movement of the plate when its respective key is depressed therein. When a special key 4 is depressed into the slot 94, the two end keys would be locked, as the inner walls of the slots 92 and 95, over which the outer keys 4 project, are inclined in opposite directions, and thus prevent the downward movement of said keys unless the plate is free to move longitudinally. When one of the said end keys is operated, it engages the incline wall of its respective slot 92 or 95, and thus moves the plate longitudinally, which causes the opposite end slot and the slot 94 to move out of alinement with their keys, and thus lock the latter from operation. In order to prevent any lateral displacement of the end keys when they are operating against the incline walls of the slots 92 and 95, the stationary plate 90 is formed with narrow vertical slots 96, into which said keys project when depressed. (See Fig. 11.)

I will now pass on to a description of the improved printing devices I have applied to this particular type of machine.

Each of the segmental frames 9, including that of the special keys, is provided with a segmental rack 97, and said racks mesh, respectively, with pinions 98, fast to nested sleeves 98$^a$. (See Figs. 2 and 15.) These sleeves extend transversely of the machine and protrude from the left-hand end of the same for the attachment of printing-wheels 99, which are arranged to print duplicate characters at both the top and bottom simultaneously upon a check-strip and a detail-strip. (See Fig. 3.) By this structure when the frames 9 are allowed to escape upward the printing-wheels move simultaneously and are thus set to print characters corresponding to the degrees of movement made by the frames. An endless traveling inking tape or ribbon 100 passes about the wheels 99 and is supported in position by antifriction-rollers 101 and a feed-roller 101$^a$, suitably mounted on the main frame. This ribbon is held taut by a weighted antifriction-roller 102, mounted in a pivoted yoke 103, so as to rest against said ribbon. The roller 101$^a$ is fast to and moves with a gear-wheel 101$^b$, hereinafter more particularly described, whereby the ribbon is advanced at each operation of the machine. Elastic platens 104 are mounted in pivoted arms 105 and 106 above and below the printing-wheels, so as to coöperate with the types upon diametrically opposite sides of the same. (See Figs. 3 and 4.) The arms 105 and 106 are of bell-crank formation and are formed with intermeshing racks 107 and 108, whereby they move simultaneously. The arm 105 receives motion through an operating extension 109, formed on the same and provided at its upper end with a pin 110, which projects into a cam-groove 111 of a disk 112. The lower arm 106 is provided with a spring-pressed pawl 113, which engages a ratchet-wheel 114, mounted on a tape-winding spool 115, which is adapted to receive the detail strip or tape 116. All backward rotation of the spool is prevented by a spring-pressed pawl 117, mounted on the main frame and engaging said ratchet-wheel 114. The detail-strip 116 passes from a supply-spool 118 up over supporting-pins 119 and the lower platen and thence to the winding-spool 115. The check-strip 120 passes from a supply-roller 121 up over guiding-roller 122 and between feeding-rollers 123 and forward between the upper platen and the tops of the printing-wheels. This check-strip is cut into checks after being printed by knives 124 and 125. The knife 124 is mounted rigidly upon the frame, while the knife 125 is supported movably in a horizontal position above the same by pivoted links 125$^a$. (See Fig. 22.) The knife 125 is depressed to engage and cut the strip extending between it and the knife 124 by means of a link-bar 127, which is pivotally connected thereto and is journaled at its upper end upon a pin 128, mounted upon a pivoted lever 129. The rear end of this lever is provided with a pin 130, which projects into a cam-groove 131, formed in a disk 132. The disks 112 and 132 are fast to a shaft 154, (see Fig. 4,) which receives motion through a gear 155, also fast thereon. Said gear 155 meshes with a gear 156, which is connected to the printer power-shaft 133 by intermediate gears 157, 158, and 159. The gear 156 carries a ratchet-wheel 160, with which engages a locking-pawl 161, whereby all backward rotation of said gears is prevented. The shaft 154 is provided at its end opposite from that carrying the gear 155 with a gear 162, which is adapted to impart motion to the gear 101$^b$ through intermediate gears 163, 164, and 165, and thus operate the ribbon-feeding roller. The means for imparting movement to the shaft 133 will be hereinafter described in connection with the gearing actuated by the operating-handle. The relative positions of the said disks is best shown in Fig. 1.

As the particular form of printer here shown is only to illustrate the application of a printer of the type-wheel class to this particular kind of machine and forms no part of the present invention, any further description of the same is not thought necessary.

The crank-handle 6, which is journaled on a suitable stud 6$^a$, mounted on the main frame, (see Figs. 1 and 6,) is provided with a pinion 134, which pinion meshes with a gear-wheel 135. This wheel 135 as well as three mutilated gears 136, 137, and 138 are journaled upon a shaft 139 and are suitably secured together so as to move as one when said wheel 135 is rotated. The relative normal positions of said mutilated gears is shown in Figs. 7, 8, and 9 of the drawings. Each of these gears comprises a disk having a series of gear-teeth about one half of its periphery and a locking-flange 140 about the remaining half, said flange being in a different vertical plane from the gear-teeth, as shown in Fig. 23. The relative sizes of the gears 134 and 135 are such that one revolution of the crank-handle and gear 134 will turn the gear 135 through one-half of its revolution. The first turn of the crank-handle will thus rotate the gear 136 through one-half of its revolution, which movement will cause it to fully rotate a gear-wheel 141, with which it meshes and which is fast upon the shaft 16 heretofore described. This rotation of shaft 16 will return all of the frames 9 and indicators to normal positions, as before described, said frames being held in their normal positions by their respective escapements and keys. After the gear 141 has made a complete revolution it becomes locked by a locking-arm 142, (see Fig. 8,) mounted thereon and arranged to lock against the periphery of the flange 140 of said mutilated gear 136. Simultaneously with the above-described operation the gear 138 (see Fig. 9) is operating a gear 143 similar to the gear 141 and arranged to be locked after a complete rotation in the same manner as said latter gear. This gear 143 is mounted on one end of a sleeve 144, (see Fig. 20,) which is journaled on the protruding end of the shaft 133 and carries a companion gear 145, fast thereto. The gear 145 meshes with an idle gear 146, which in turn meshes with gears 147 and 148, mounted, respectively, on shafts 25 and 149, which latter is the usual transfer-line shaft, which forms no part of the present invention, and thus needs no further description. It will be seen from the above that the shafts 16, 25, and 149 are rotated upon the first movement of the crank-handle, but remain stationary and locked upon the second movement of the same. It will be observed that the construction of the gear 138 and its locking-flange 140 and the timing of the disengagement of said gear from the gear 143 is such that when the operating-handle has made its first revolution the gear 138 is not quite free from the gear 143, and any attempt to continue the rotation of the operating-handle would rotate the gear 143 (and consequently the shaft 25 by means of the intermediate gearing) enough to bring the aforesaid locking projection $4^f$ against the stop $4^e$ prior to the complete disengagement of the gear 138 from the gear 143, and therefore the operating-handle is locked from continued rotation until the release-key has been operated, and the stop $4^e$ thereby withdrawn from the projection $4^f$ in the manner above described. The movement of the shaft 25 as before described draws down the flash, unlocks the amount-keys, and locks the handle from more than one rotation. After the first rotation of the handle the amount-keys are operated to register the amount and set the printing-wheels and indicators. The release-key is then operated, which raises the flash and releases the operating-handle, so that it may be again operated to actuate the printer-shaft 133. This shaft is provided with a gear-wheel 150, similar to gear 143 and coacting with the gear 137 in substantially the same manner that said gear 143 does with the gear 138, with the exception that it is upon the second stroke of the operating-handle or during the last half of the revolution of the gear 135. (See Figs. 7 and 20.) As the operating-handle does not become locked at the end of its second stroke in the manner before described in connection with its first stroke, it becomes necessary to provide some means for arresting said handle at normal position at the completion of said second stroke. For this purpose I provide said handle with a spring-pressed stop-plunger 151, which normally projects from the handle, so as to engage a stud 152, mounted on the frame. The stop-plunger is withdrawn out of the path of the stud 152 by any suitable operating-button 153, mounted on said operating-handle, which structure is old in the art and needs no detail description.

It will be seen from the above that when the special-transaction keys are operated a special indicator is exposed, the operation of the key registered, and a designation of the character of the special transaction printed in connection with the amount upon the detail-strip. If so desired, the special keys may represent different departments, so that the record on the detail-strip will indicate in which department each sale belongs.

Having thus described my invention, what I claim as new, and desire to secure by Letters Patent, is—

1. In a cash-register, the combination with a series of amount-indicators, of a special indicator arranged to obscure said amount-indicators, a series of operating devices for the amount-indicators and means set by said devices and arranged to cause the special indicator to disclose the amount-indicators.

2. In a cash-register, an indicating mechanism, including a spring-actuated rack, a special escapement indicator geared to said rack, and having a series of graduated stops, a series of special keys, a movable stop device adjusted by any one of the keys into coöperative relation with the graduated stops to arrest the indicator according to the special key operated, and means for releasing said indicator to allow it to move into its proper arrested position as determined by said stop device.

3. In a cash-register an indicating mechanism, including an escapement special indicator, a series of special keys, and means operated by the special keys for releasing the special indicator and a single arresting device controlled by the special keys to arrest the indicator at different points.

4. In a cash-register an indicating mechanism including an escapement special indicator having a series of graduated stops, special-transaction keys, a single means moved by said keys and coöperating with said stops to arrest the indicator in different positions, and means for releasing said indicator to allow it to move into its proper arrested position as determined by said stop device.

5. In a cash-register the combination with a series of amount-keys, of a series of escapement amount-indicators, a series of special-transaction keys, a special indicator for the same, a special counter for one of said special keys, and means operated by the amount-keys for rendering the special counter inoperative.

6. In a cash-register, the combination with a series of amount-indicators, and registering devices, of a special indicator arranged to obscure said amount-indicators and means for moving said special indicator from in front of the amount-indicators only when one of said amount-indicators has been set to indicate and one of said registering devices has been operated.

7. In a cash-register, the combination with a series of amount-indicators, of a special indicator arranged to obscure said amount-indicators, a flash arranged to obscure the special indicator and means for causing the special indicator to move with the flash and disclose the amount-indicators only when one of said amount-indicators has been set to indicate.

8. In a cash-register, an indicating mechanism including a special-transaction escapement indicator having a series of graduated stops, a series of special keys and a single stop device for limiting the movement of said special indicator, means for releasing said indicator to allow it to move into its proper arrested position as determined by said stop device, and devices for returning the indicator to its normal position.

9. In a cash-register, an indicating mechanism including a special indicator having a series of graduated stops, a series of special keys, and a single stop device coöperating with the graduated stops for controlling said indicator, means controlled by said keys for releasing said indicator to allow it to move into its proper arrested position as determined by said stop device, and an operating-handle for returning the indicator to its normal position.

10. In a cash-register the combination with a series of escapement amount-indicators, of a series of amount-keys for releasing the same, a special-transaction escapement-indicator, a series of special-transaction keys, a movable stop arranged to arrest the special indicator at different points, a rock-frame for moving said stop, and means connecting the rock-frame to said special keys.

11. In a cash-register, the combination with a series of amount-indicators, of a special indicator arranged to obscure said amount-indicators, a series of devices for setting the amount-indicators, a member common to and arranged to be moved by any of said devices, and means set by said member and arranged to move the special indicator from in front of the amount-indicators.

12. In a cash-register, the combination with a series of amount-indicators, of a special indicator arranged to obscure said amount-indicators, a flash, an operating-bar for said flash, an independent operating-bar for said special indicator, indicator-setting devices for the amount-indicators, and means operated by said devices for coupling said bars to move together.

13. In a cash-register the combination with a series of escapement amount-indicators, of a series of amount-keys coöperating therewith, a series of special-transaction keys, a series of special counters for the respective special keys, an indicator coöperating with said special keys, and means adapted to be actuated by the amount-keys for rendering the counter of one of the special keys inoperative.

14. In a cash-register the combination with a series of escapement amount-indicators, of a series of amount-keys coöperating therewith, a series of special-transaction keys, a special indicator for the same, a stop operated by the special keys to arrest said indicator, independent counters for the special keys, and means operated by the amount-keys for disconnecting one of the special keys from its counter.

15. In a cash-register the combination with a series of escapement amount-indicators, of a series of amount-keys for the same, a special indicator, a special key for the same, a special counter for said special key, and means arranged to be operated by the amount-keys for rendering the special key inoperative in connection with its counter.

16. In a cash-register, an indicating mechanism including an escapement special-transaction indicator, a series of special keys, a single stop device connected to said keys and arranged to allow the indicator to move different distances according to the value of the key operated, means controlled by the keys for releasing said indicator to allow it to move to proper setting position, and devices independent of the keys for returning the indicator to its normal position.

17. In a cash register the combination with an escapement-wheel having graduated projections, of a stop arranged to be moved so as to coöperate with any one of said projections, a cam for moving said stop, a series of keys and means intermediate said keys and cam for moving the latter according to the value of the key operated.

18. In a cash-register the combination with an escapement-wheel having graduated projections located in different vertical planes, of a stop arranged to be moved laterally so as to coöperate with any one of said projections, a series of keys arranged to move said stop according to the value of the key operated, and means for releasing said wheel to allow it to move into its proper arrested position as determined by said stop.

19. In a cash-register the combination with an escapement-wheel having graduated projections located in different planes, of a stop coöperating with said projections, a series of keys arranged to move said stop to different positions according to the value of the key operated, and means for releasing said wheel to allow it to move into its proper arrested position as determined by said stop.

20. In a cash-register the combination with an escapement-wheel having graduated projections of a movable stop adapted to be moved into alinement with any one of said projections, a cam for moving said stop, a series of keys arranged to move said cam different distances according to the value of the key operated, and means for releasing said wheel to allow it to move into its proper arrested position as determined by said stop.

21. In a cash-register the combination with an escapement-wheel having graduated projections, of a movable stop arranged to be moved into alinement with any one of said projections, a series of keys, means connecting said keys to said stop whereby it is moved to arrest the escapement-wheel according to the value of the key operated, and means for releasing said wheel to allow it to move into its proper arrested position as determined by said stop.

22. In a cash-register the combination with a series of escapement amount-indicators, of a series of amount-keys controlling the same, a special release and no-sale key, a special counter for said special key and means for preventing the operation of the counter when one of the amount-keys is operated.

23. In a cash-register the combination with a series of special-transaction keys, of a movable frame arranged to be moved different distances by the same, a movable stop, a cam for operating the same, means connecting said frame and cam, and a special indicator having graduated projections adapted to abut against said stop.

24. In a cash-register the combination with a series of escapement-frames, of a series of amount-keys coöperating therewith, a movable arm, means engaging said frames and connected to said arm, a special indicator, operating means for said indicator for rendering the same invisible, and a device connecting the movable arm and said operating means.

25. In a cash-register, the combination with a series of operating devices, of a series of amount-indicators connected thereto, a special indicator arranged to obscure the amount-indicators, a flash, an operating-bar for said flash, and a member common to all of the operating devices and arranged to couple the special indicator to the operating-bar.

26. In a cash-register, the combination with a series of registering-frames, of a member common to and operated by any one of said frames, a special indicator, an indicator-flash operating over the same, devices for coupling the flash and indicator together, and means connecting said coupling devices to the common member.

27. In a cash-register, the combination with a series of registering-frames, of a member common to and operated by any one of said frames, a special indicator, an indicator-flash, and means operated by the common member for causing the special indicator to move with the flash.

28. In a cash-register, an indicating mechanism including a pivoted spring-drawn rack, a special escapement-indicator connected to said rack and provided with a series of graduated stops, and a series of special keys, and connections for arresting said indicator.

29. In a cash-register the combination with a series of regular keys, of a combined special-transaction and release key, a counter arranged to be operated by the special key in its capacity of a special-transaction key, and means operated by the regular keys for rendering the counter inoperative in connection with the special key.

30. In a cash-register the combination with a series of regular keys, of a combined special-transaction and release key, means arranged to be controlled by the regular keys for adjusting the special key to one or both of its uses.

31. In a cash-register the combination with a series of amount-keys, of a special key, and means thrown into action by the operation of the amount-keys for latching the special key against more than one operation during a single operation of the machine.

32. In a cash-register the combination with a registering mechanism, of printing devices connected thereto, an operating-handle arranged upon its first revolution to operate the registering mechanism and upon its second revolution the printer but become locked between said revolutions, and a release-key for unlocking said handle.

33. In a cash-register the combination with a series of amount-keys of a series of special keys, a combined special and release key, and means arranged to be operated by the first-mentioned special keys for rendering the combined key inoperative in its special-key capacity.

34. In a cash-register the combination with an escapement-indicator, of a series of keys, a stop for controlling the indicator, a latch for said indicator, and means connected to the keys for first setting the stop and then tripping the latch.

35. In a cash-register the combination with a series of amount-keys, of a series of special keys, a combined special and release key, and a movable frame common to all of the amount-keys and arranged to be operated by the same to render the combined key inoperative in its special capacity.

36. In a cash-register the combination with a series of amount-keys, of a series of special keys, a combined special and release key, and means arranged to be operated by the amount-keys or the first-mentioned special keys for rendering the combined key inoperative in its special-key capacity.

37. In a cash-register the combination with a series of escapement-frames, of a series of amount-keys coöperating therewith, a special indicator, operating means for said indicator for rendering the same invisible and devices for operating said means upon the movement of the escapement-frames.

38. In a cash-register the combination with a series of escapement amount-indicators, of a series of amount-keys for releasing the same, a special-transaction-escapement indicator, a series of special transaction-keys, a movable stop moved by said special keys and arranged to arrest the special indicator at different points according to the key operated, and means controlled by said special keys for releasing said special indicator to allow it to move into its proper arrested position as determined by said stop.

39. In a cash-register the combination with a series of amount-keys, of a series of special keys, a combined release and special key, a counter operated by said key when used in its special capacity, and means operated by the amount-keys and the remaining special keys for rendering the combined key inoperative in its special capacity.

40. In a cash-register the combination with a series of amount-keys, of a series of special keys, a combined special and release key, and means for rendering the latter inoperative in its special capacity when any one of the other keys is operated.

41. In a cash-register the combination with a series of amount-keys, of a series of special keys, a combined special and release key, a frame common to the first-mentioned special keys and means connected to the said frame for rendering the combined key inoperative in its special capacity.

42. In a cash-register the combination with a series of amount-keys, of a series of special keys, a combined special and release key, a frame common to the first-mentioned special keys, another frame common to the amount-keys, means connecting said frames, and devices connected to one of said frames for rendering the combined key inoperative in its special capacity.

43. In a cash-register the combination with the amount-keys and indicators therefor, of a flash or shield for said indicators, a special indicating-flash mounted within the main flash, means operated by the amount-keys for connecting the flashes whereby they move together, and a special key arranged to release the main flash alone.

44. In a cash-register the combination with a series of amount-keys, of a special key, a latch-plate for said key, means for normally holding the latch-plate out of operative position and devices coöperating with the amount-keys for releasing the latch-plate and allowing it to assume its operative position.

45. In a cash-register the combination with a series of amount-keys, of a special key, a counter for said latter key, a frame common to the amount-keys, a latch for holding said frame in depressed position when operated, means for releasing said latch, and means connected to the frame for rendering the special key inoperative in connection with its counter.

46. In a cash-register, the combination with a series of registering-frames, of a special indicator, means for operating said indicator and devices for setting the indicator-operating means for operation upon the movement of any one of the registering-frames.

47. In a cash-register, the combination with a series of special-transaction keys, of a movable frame arranged to be moved different distances by the same, a movable stop, means connecting said frame and stop, a special indicator having graduated projections adapted to abut against said stop, and means controlled by said keys for releasing said indicator to allow it to move into its proper arrested position as determined by said stop.

48. In a cash-register, the combination with a series of amount-keys, a special "release" and "no-sale" key, a special counter for said special key, and means for preventing the operation of the counter when one of the amount-keys is operated.

49. In a cash-register, the combination with an escapement-wheel having graduated projections, of a stop arranged to be moved so as to coöperate with any one of said projections, a series of keys, means intermediate the keys and stop whereby the latter is moved according to the value of the key operated, and means for releasing said wheel to allow it to move into its proper arrested position as determined by said stop.

50. In a cash-register, an indicating mechanism including a pivoted spring draw-rack, a special-transaction escapement-indicator connected thereto, a series of special keys, means connected to said keys and arranged to release the special indicator and subsequently arrest it at the desired position, and means for returning the spring-actuated rack to its normal position.

51. In a cash-register, the combination with a series of amount-keys, of a series of special-transaction keys, a special indicator, a stop operated by the special keys and arranged to arrest the special indicator, independent counters for the special keys and means operated by the amount-keys for rendering one of the special keys inoperative in connection with its counter.

52. In a cash-register, the combination with a series of amount-keys, of a series of special keys, a special counter for one of said special keys, and means operated by the amount-keys for rendering the special counter inoperative in connection with its key upon the operation of the latter.

53. In a cash-register, the combination with a series of amount-indicators and operating devices, of a special-transaction escapement-indicator, a series of special-transaction keys, a movable stop arranged to arrest the special indicator at different points, means connecting the special keys to said stop, and means for releasing said special indicator to allow it to move into its proper arrested position as determined by said stop.

54. In a cash-register the combination with a series of amount-indicators, of a special-transaction escapement-indicator having a series of graduated stops, a series of special keys for limiting the movement of said special indicator, means controlled by said special keys for releasing said special indicator to allow it to move into its proper arrested position as determined by said stops, and devices for returning all of said indicators to zero or normal position.

55. In a cash-register, the combination with a series of amount-keys, of a series of special-transaction keys, a special indicator, a special counter for one of said special keys, and means operated by the amount-keys for rendering the special counter inoperative in connection with its key.

56. In a cash-register, the combination with a series of regular keys, of a special key having two functions and means controlled by the regular keys for adjusting the special key to one or both of its uses.

57. In a cash-register, the combination with an operating mechanism, of a printer, an operating-handle arranged upon its first revolution to actuate the operating mechanism and upon its second revolution the printer but become locked between said revolutions, and a release device for unlocking said handle.

58. In a cash-register, the combination with an operating mechanism, of a printing device, a rotary handle arranged to operate said mechanism and printer at different periods, means for locking the handle between the periods, and devices for operating the locking means.

59. In a cash-register the combination with an operating mechanism, of a rotary operating-handle adapted to make a plurality of complete rotations for each registration, a lock which automatically locks the handle before the completion of its operation and a release device for operating said lock.

60. In a cash-register, the combination with an operating mechanism, of a rotary operating-handle means for automatically locking the handle after it has made two complete revolutions, and a release device for said handle connected to the movable parts of the machine.

61. In a cash-register, the combination with an operating mechanism, of an operating-handle, means for automatically locking the handle after it has made a plurality of complete strokes, and a release device for said handle connected to the movable parts of the machine.

62. In a cash-register, the combination with an operating mechanism, of an operating-handle arranged to have a plurality of revolutions for one complete operation of said operating mechanism, and means connected to said operating mechanism for locking said handle before it has completed its plurality of revolutions.

63. In a cash-register, the combination with an operating mechanism, of an operating-handle arranged to be given a plurality of strokes for one complete operation of said operating mechanism, and means connected to said operating mechanism for locking said handle prior to the completion of its plurality of strokes.

64. In a cash-register, the combination with a series of amount-keys, of a special key, a latch for the special key arranged to be released by the operation of the amount-keys and a movable portion on said latch for preventing it from catching on the special key until the latter has been once depressed.

65. In a cash-register, the combination with a series of amount-keys, of an operating-handle, a special key and a pivoted latch for said special key operated by the amount-keys for latching the special key against a second operation until the handle is operated.

66. In a cash-register, the combination with a series of amount-keys, of an operating-handle, a special key and means thrown into action by the operation of the amount-keys for latching the special key against a second operation until the handle is operated.

67. In a cash-register, the combination with an escapement-indicator having graduated stop projections, a relatively stationary stop arranged to be moved into the path of said projections, a latch for said indicator and means connected to the keys for first setting the stop and then tripping the latch.

68. In a cash-register, the combination with a series of keys having latching projections, of a series of independent pivoted bell-crank latching-levers arranged to engage the respective projections, and a series of cams connected to the movable parts of the machine and arranged to operate said bell-crank levers.

69. In a cash-register, the combination with a registering mechanism, of printing devices connected thereto, an operating-handle arranged upon its first revolution to operate the registering mechanism and upon its second revolution the printer but become automatically locked between the revolutions, means for unlocking said handle, and an auxiliary lock for arresting the handle at the end of each revolution.

70. In a cash-register, the combination with a registering mechanism, of printing devices connected thereto, an operating-handle arranged upon its first revolution to operate the registering mechanism and upon its second revolution the printer but become locked between said revolutions and means for unlocking said handle.

71. In a cash-register, the combination with a series of registering elements, of a special indicator arranged to be normally disclosed, an operating device for moving said special indicator from indicating position, and means for setting said indicator-operating device for operation upon the movement of any one of the registering elements.

72. In a cash-register, the combination with an operating mechanism including an operating-handle arranged to be given two complete revolutions and then arrested, means connected to the operating mechanism for arresting said handle at the end of the first complete revolution thereof, and a special key for releasing said handle.

73. In a cash-register, the combination with an operating mechanism, of a printing device, a rotary handle arranged to operate said mechanism and printer at different periods, means for locking the handle between the periods, and a special key for operating the locking means.

74. In a cash-register, the combination with an operating mechanism and a series of keys, of a series of indicators controlled by said keys, a special indicator for concealing said series of indicators and arranged normally to rest in concealing position, and means requiring the operation of one of said keys to set said special indicator to be raised by said operating mechanism.

75. In a cash-register the combination with a series of indicators, of a special indicator arranged to normally conceal the regular indicators, an operating mechanism, and means for connecting the special indicator to the operating mechanism when one of the regular indicators is set.

76. In a cash-register the combination with a series of indicators, of a special indicator normally concealing said indicators, an operating mechanism, setting means for the regular indicators, and devices controlled by said setting means for connecting the special indicator to the operating mechanism.

77. In a cash-register the combination with a series of indicators, of an operating mechanism, a special indicator for concealing the indicators normally disconnected from the operating mechanism, setting devices for the regular indicators, and means controlled by the setting devices for connecting the special indicator to the operating mechanism.

78. In a cash-register the combination with a series of indicators, of a special indicator normally hiding the same, an operating mechanism normally disconnected from the special indicator, and means for connecting the special indicator to the operating mechanism when one of the indicators is set.

79. In a cash-register the combination with a series of indicators, of a special indicator for said indicators arranged to conceal the same until some one of the indicators is moved from its normal zero-indicating position.

80. In a cash-register the combination with a series of indicators, each provided with a series of indicating characters and a special indicator for concealing all of the indicators until some one of the same is moved from its normal zero-indicating position.

81. In a cash-register the combination with an operating mechanism, of a handle for actuating the same arranged to be given a plurality of complete movements to accomplish the operation, a series of controlling elements for the operating mechanism, and means connected to the operating mechanism for automatically arresting the actuating-handle before it has completed its plurality of complete movements.

82. In a cash-register, the combination with a register-operating mechanism, of an operating-handle therefor, means for locking said operating-handle after its operation has begun but prior to the completion of its normal cycle of operation, and key-released means for releasing said handle to permit the same to complete its normal cycle of operation.

83. In a cash-register, the combination with a registering and a printing mechanism together with an operating mechanism therefor, of an operating-handle for said operating mechanism arranged to have divided movements one for operating the registering mechanism and one for operating the printing mechanism, automatic means for locking said handle between said divided movements, and means for releasing said lock.

84. In a cash-register, the combination with an escapement member provided with a series of stops for arresting said member in differential positions, a single stop device arranged to coact with said series of stops, and a series of keys and connecting means for setting said single stop device to proper position upon the initial movement of a key and then releasing said escapement member upon the final movement of the key.

In testimony whereof I affix my signature in the presence of two witnesses.

JOSEPH P. CLEAL.

Witnesses:
   JOHN A. WERNER,
   PEARL N. SIGLER.